United States Patent
Chen et al.

(10) Patent No.: US 6,445,750 B1
(45) Date of Patent: *Sep. 3, 2002

(54) TECHNIQUE FOR COMMUNICATING DIGITALLY MODULATED SIGNALS OVER AN AMPLITUDE-MODULATION FREQUENCY BAND

(75) Inventors: Brian Chen, Somerville, MA (US); Carl-Erik Wilhelm Sundberg, Chatham, NJ (US)

(73) Assignee: Lucent Technologies Inc., Murray Hill, NJ (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/064,938
(22) Filed: Apr. 22, 1998
(51) Int. Cl.[7] .............................................. H04L 27/04
(52) U.S. Cl. ........................ 375/300; 375/268; 375/296; 455/108
(58) Field of Search ................................. 375/296, 268, 375/270, 285, 300, 301, 320, 321, 341; 332/149, 170; 329/347, 357; 455/108, 109, 47, 501; 370/480, 485, 487, 529

(56) References Cited

U.S. PATENT DOCUMENTS

| | | | | |
|---|---|---|---|---|
| 5,588,022 A | * | 12/1996 | Dapper et al. .............. | 375/216 |
| 5,726,978 A | * | 3/1998 | Frodigh et al. ............. | 370/252 |
| 5,745,525 A | * | 4/1998 | Hunsinger et al. .......... | 375/285 |
| 5,748,677 A | * | 5/1998 | Kumar ........................ | 375/285 |
| 5,949,796 A | * | 9/1999 | Kumar ........................ | 370/529 |
| 6,005,894 A | * | 12/1999 | Kumar ........................ | 375/270 |
| 6,144,705 A | * | 11/2000 | Papadopoulos et al. ..... | 375/296 |
| 6,160,791 A | * | 12/2000 | Bohnke ....................... | 370/208 |
| 6,178,317 B1 | * | 1/2001 | Kroeger et al. ............. | 455/296 |

OTHER PUBLICATIONS

D. Hartup et al., "AM Hybrid IBOC DAB System," *USA Digital Radio*, 1997, pp. 1–8.

\* cited by examiner

*Primary Examiner*—Stephen Chin
*Assistant Examiner*—Chieh M. Fan
(74) *Attorney, Agent, or Firm*—Ryan, Mason & Lewis, LLP

(57) ABSTRACT

In a communications system implementing an in-band on channel AM (IBOC-AM) (also known as "hybrid IBOC-AM") scheme, digitally modulated signals are transmitted in a 30 kHz digital band centered at an analog host AM carrier frequency $f_c$. The host AM carrier is assigned to the geographic area served by the communications system for AM radio broadcast. It is likely that a similar IBOC-AM scheme is implemented in an adjacent area which is assigned a second analog host AM carrier having a frequency which is either 20 kHz higher or lower than $f_c$. In that case, the transmission of the digitally modulated signals are interfered by a similar transmission in the adjacent area. The interference is known as "second adjacent channel interference." To reduce such interference, selected power profiles in accordance with the invention are used to allocate the relative transmission power to the digitally modulated signals in the digital band.

43 Claims, 4 Drawing Sheets

TECHNIQUE FOR COMMUNICATING DIGITALLY MODULATED SIGNALS OVER AN AMPLITUDE-MODULATION FREQUENCY BAND

FIELD OF THE INVENTION

The invention relates to systems and methods for communications of digit ally modulated signals, and more particularly to systems and methods utilizing an amplitude-modulation (AM) frequency band to communicate digitally modulated signals.

BACKGROUND OF THE INVENTION

The explosive growth of digital communications technology has resulted in an ever-increasing demand for bandwidth for communicating digital information. Because of the scarcity of available bandwidth for accommodating additional digital communications, the industry recently turned its focus to the idea of utilizing the preexisting analog AM band more efficiently to help make such an accommodation. However, it is required that any adjustment to the AM band to provide the additional capacity for digital communications does not significantly affect the analog AM signals currently generated by radio stations on the same band for AM radio broadcast. In the United States, adjacent geographic areas covered by AM radio broadcast are assigned different AM carrier frequencies, which are at least 20 kHz apart. Specifically, when they are exactly 20 kHz apart, the AM carrier assigned to the adjacent area is referred to as a "second adjacent carrier."

An in-band on channel AM (IBOC-AM) (also known as "hybrid IBOC-AM") scheme utilizing bandwidth of the AM band to communicate digital audio information has been proposed. In accordance with the proposed scheme, digitally modulated signals representing the audio information populate, e.g., a 30 kHz digital band centered at an analog host AM carrier. The power levels of the spectrums of the digitally modulated signals are allowed to e equally high across a 10 kHz subband in the digital and on each end thereof.

However, in implementation, it is likely that two such IBOC-AM schemes would be respectively employed in two adjacent areas, to which the host AM carriers assigned are 20 kHz apart. In that case, the 30 kHz digital bands for digital communications entered at the respective host AM carriers overlap each other by 10 kHz, thereby causing undesirable "adjacent channel interference" to each area. In particular, such interference is referred to as "second adjacent channel interference," as the dominant interfering carrier in this instance consists of a second adjacent carrier. The second adjacent channel interference degrades the digital communications in each of the adjacent areas, especially in the parts of the areas which are close to their common border.

Accordingly, there exists a need for a technique for effectively reducing adjacent channel interference in adjacent areas where IBOC-AM schemes are employed.

SUMMARY OF THE INVENTION

The invention overcomes the prior art limitations by using improved power profiles for transmission of digitally modulated signals to reduce the adjacent channel interference described above. In accordance with the improved power profiles, the power levels of a subset of the digitally modulated signals populating a subband (e.g., the overlapping 10 kHz subban described above) in the aforementioned digital band are made relatively low, with respect to the power levels of a second subset of the digitally modulated signals populating a second subband (e.g., the entire digital band excluding the overlapping band) in the digital band.

In accordance with an aspect of the invention, at least one of the digitally modulated signals represents control information indicative of a selected one of the improved power profiles which is used in the transmission. This stems from the fact that such control information needs to be transmitted to a receiver for proper recovery of the digital information represented by the remaining digitally modulated signals.

DETAILED DESCRIPTION

Figure 1:
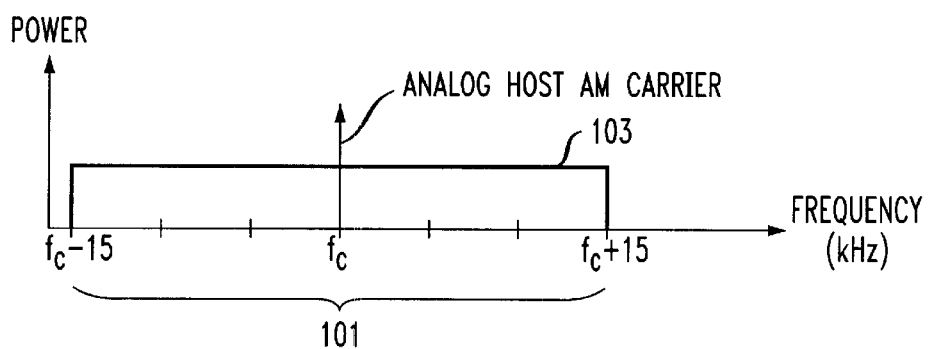
FIG. 1 illustrates a prior art power profile of digitally modulated signals transmitted over an AM frequency band.

The invention is directed to a technique for digital communications over an amplitude-modulation (AM) band which is currently used by radio stations for AM radio broadcast. Referring to FIG. 1, in a prior art in-band on channel AM (IBOC-AM) (also known as "hybrid IBOC-AM") scheme which has been proposed, digitally modulated signals representative of digital audio information populate digital band 101 which is 30 kHz wide, and centered at an analog host AM carrier having a frequency $f_c$ for radio broadcast. An analog AM signal containing the radio broadcast information, although not shown in FIG. 1, occupies a subband ranging from $f_c$–5 kHz to $f_c$+5 kHz. A multicarrier modem is use to transmit the digitally modulated signals, with uniform transmission power allocated thereto, resulting in power profile 103 of the signal spectrums which is uniform across digital band 101 and symmetric about $f_c$. For example, the digital transmission by the multicarrier modem may be in accordance with an orthogonal frequency division multiplexed (OFDM) (also known as a "discrete multitone") scheme.

However, we have recognized that use of the proposed IBOC-AM scheme in two adjacent areas, to which host AM carriers respectively assigned are 20 kHz apart, which is likely, causes significant "second adjacent channel interference." Such interference undesirably degrades the digital communications in each of the adjacent areas, especially in the parts of the areas close to their common border. In accordance with the invention, selected power profiles, other than power profile 103, are used to define the relative transmission power allocated to the digitally modulated signals populating digital band 101 to reduce the second adjacent channel interference. These selected power profiles in accordance with the invention are fully described below.

Figure 2:
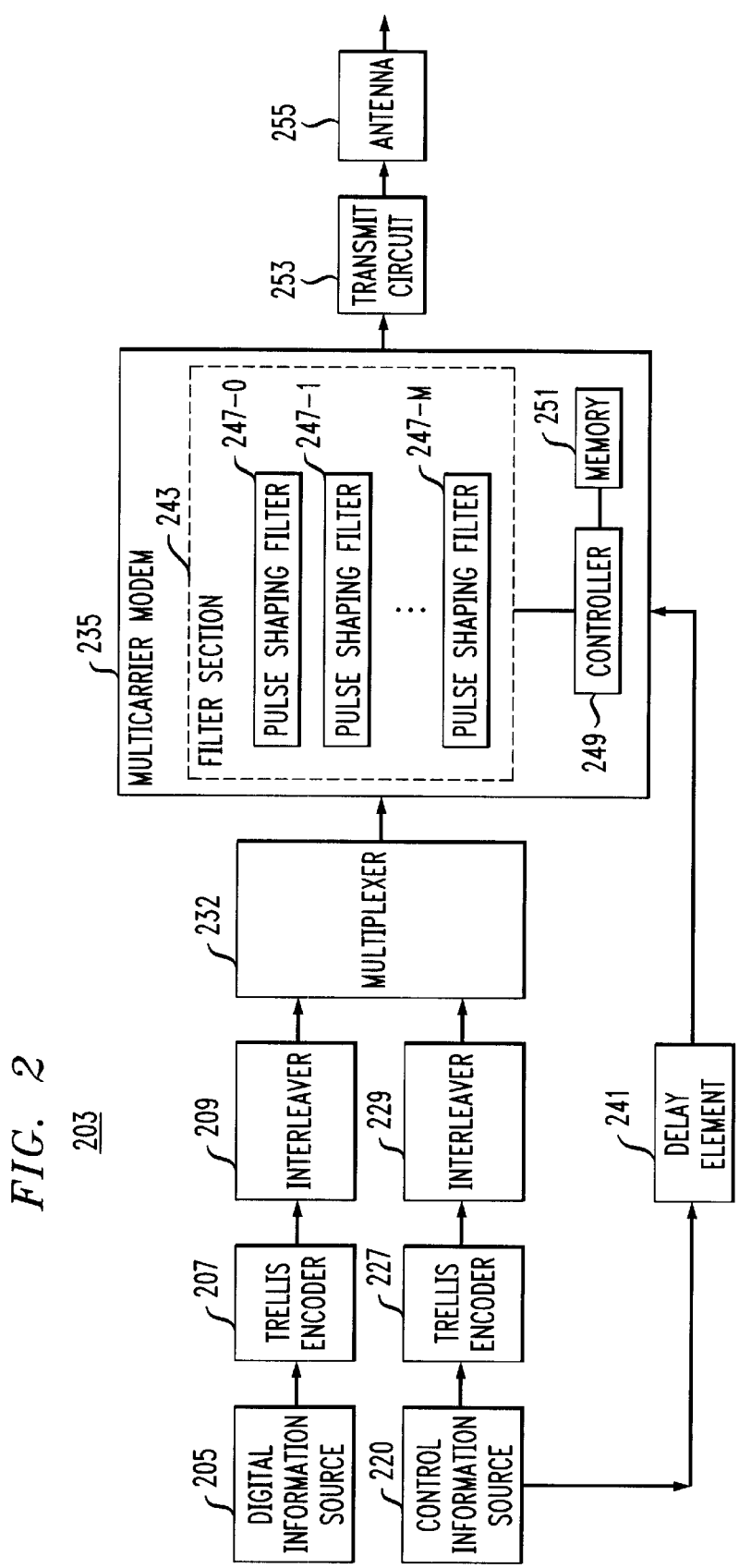
FIG. 2 is a block diagram of a transmitter for transmitting digitally modulated signals over an AM frequency band in accordance with the invention.

FIG. 2 illustrates transmitter 203 in an IBOC-AM communications system embodying the principles of the invention. The system is used to communicate digitally modulated signals over an AM frequency band in a geographic area which is assigned an analog host AM carrier whose frequency is $f_c$. In transmitter 203, digital information source 205 provides a bit stream representing digital information which may include data, audio and/or video information to trellis encoder 207. This bit stream is processed by encoder 207 on a symbol interval by symbol interval basis, where the symbol interval has a predetermined duration T.

In a well known manner, encoder 207 encodes the received bit stream in accordance with a trellis code to provide the communication system with a so-called "coding gain" which manifests itself in the form of enhanced immunity to such random channel impairments as additive noise, without sacrificing the source bit rate or requiring additional broadcast bandwidth. Specifically, encoder 207 introduces redundancy into the received bit stream in accordance with the trellis code to allow use of a maximum likelihood decoding technique at receiver 803 in FIG. 8 to be described. This redundancy takes the form of one or more additional bits. During each symbol interval, encoder 207 forms an encoded word, which includes redundancy bits and information bits and is used to select a symbol from a signal constellation of conventional design. The selected symbols from encoder 207 are interleaved by interleaver 209 to pseudo-randomize the symbols.

Similarly, control information source 220 provides a bit stream, albeit at a lower bit rate than that from source 205 described before, to trellis encoder 227. This bit stream contains control data identifying one of the power profiles in accordance with the invention to be used in transmitter 203, and well known control channel information including system status information and transmission parameters e.g., night time vs. day time). These control data and control channel information are to be transmitted through a control channel to receiver 803 for its proper configuration conducive to accurate recovery of transmitted digital information. For example, the control data comprises k bits per time frame, which is (M+1) symbol intervals long, where k and M are predetermined integers. In accordance with the invention, the control data identifies one of the $2^k$ preselected power profiles made available in multicarrier modem 235 which is deemed to be the most desirable for use to control the second adjacent channel interference under the current conditions. For that purpose, the control data is also conveyed through delay element 241 to modem 235 to identify the desirable power profile to be used therein. Delay element 241 is employed to impart a predetermined amount of delay to the control data to ensure that the identified power profile corresponds to the correct time frame. This predetermined amount of delay takes into account the time required for processing of the bit stream from source 220 by the intermediary components including trellis encoder 227, interleaver 229 and multiplexer 232.

In a well known manner, encoder 227 encodes the bit stream from source 220 in accordance with a second different trellis code, affording to the control data and control channel information a better coding gain than the trellis code used in encoder 207. This stems from the fact that such data and information are needed in receiver 803 for its proper configuration, and thus vital to recovery of transmitted digital information. In other words, the control data and control channel information are preferably afforded a higher level of protection than the digital information by using the different trellis code or any other means of over protection.

In any event, the output of encoder 227 is a sequence of symbols selected from a second signal constellation based on the encoded words formed by encoder 227. This sequence of symbols is interleaved by interleaver 229 similar to interleaver 209. Multiplexer 232 in each time frame multiplexes a symbol from interleaver 229, containing the control data and control channel information, with M symbols from interleaver 209, containing the digital information.

Multicarrier modem 235 transmits the multiplexed (M+1) symbols in each time frame, in accordance with the well known OFDM scheme. Specifically, modem 235 provides (M+1) carrier frequencies or tones, and includes in filter section 243 pulse shaping filters 247-0 through 247-M each associated with a respective carrier frequency. The (M+1) symbols from multiplexer 232 are fed to filters 247-0 through 247-M, respectively, to generate (M+1) pulse shaping carriers or digitally modulated signals. Each pulse shaping carrier occupies a subband within digital band 101 in FIG. 1. In particular, one of the pulse shaping carriers represents the symbol containing the control data and control channel information. The remaining M pulse shaping carriers respectively represent the other M symbols containing the digital information to be transmitted.

In accordance with the invention, the power profile defining the relative transmission power afforded by filter section 243 to the (M+1) pulse shaping carriers populating digital band 101 is selected based on control data received from delay element 241. In response to the received control data which comprises k bits as mentioned before, controller 249 in modem 235 retrieves from memory 251 one of the $2^k$ sets of power profile parameters prestored therein, which defines the power profile identified by the control data. Controller 249 provides the set of retrieved parameters to filter section 243 to realize the identified power profile. The resulting pulse shaping carriers generated by section 243 which have the relative power levels specified by the identified power profile are processed by transmit circuit 253 for transmission. Circuit 253 may include, e.g., a conventional radio-frequency (RF) up-converter and power a amplifier. The processed signal is then transmitted using antenna 255 of conventional design via digital band 101.

For example, some of the power profiles defined by the parameter sets stored in memory 251 are illustrated in FIGS. 3A, 3B, 4A, 4B, 5A, 5B, 6A and 6B. These power profiles may be used to reduce the aforementioned second adjacent channel interference in accordance with the invention where a similar IBOC-AM scheme for digital communications is implemented in a single adjacent geographic area, which is assigned an analog host AM carrier having a frequency either 20 kHz higher or 20 kHz lower than $f_c$, with the assumption that antenna 255 is non-directional.

Figure 3A:
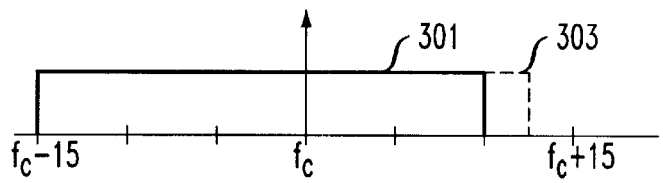
FIGS. 3A, 4A, 5A and 6A illustrate different power profiles which may be used in transmitter of FIG. 2 to transmit the digitally modulated signals in a first area when a second area adjacent thereto is assigned an AM carrier having a higher frequency than that of the AM carrier assigned to the first area.

FIG. 3A illustrates power profile 301 which is defined by solid lines, power profile 303 which is an alternative to profile 301, with modification thereto indicated by dash lines. Profiles 301 and 303 may be used where the adjacent area is assigned a 20 kHz higher host AM carrier. To reduce the second adjacent channel interference occasioned by use of prior art power profile 103 in FIG. 1 having a uniform non-zero power level across digital band 101, power profile 301 in accordance with the invention is designed to have a uniform non-zero power level from $f_c-15$ kHz to only $f_c+10$ kHz in digital band 101, and zero power level in the remaining band. Similarly, profile 303 has a uniform non-zero power level from $f_c-15$ kHz to only $f_c+12.5$ kHz in band 101, and zero power level in the remaining band.

Figure 3B:
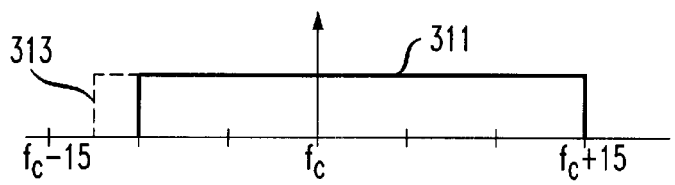
FIGS. 3B, 4B, 5B and 6B illustrate different power profiles which may be use in transmitter of FIG. 2 to transmit the digitally modulated signals in a first area when a second area adjacent thereto is assigned an AM carrier having a lower frequency than that of the AM carrier assigned to the first area.

Referring also to FIG. 3B, power profile 311 which is analogous to profile 301 and power profile 313 which is analogous to profile 303 may be used where the adjacent area is assigned a 20 kHz lower host AM carrier. Specifically, profile 311 has a uniform non-zero power level from $f_c-10$ kHz to $f_c+15$ kHz in digital band 101, and a zero power level in the remaining band. Profile 313 has a uniform non-zero power level from $f_c-12.5$ kHz to $f_c+15$ kHz in band 101, and a zero power level in the remaining band.

Thus, by mutuality, in two adjacent areas whose respective host AM carrier frequencies $f_c$'s are 20 kHz apart, the area that has a relatively low $f_c$ implements profile 301 while the other area that has a relatively high $f_c$ implements profile 311. As such, profiles 301 and 311 are "complementary" to each other. In that case, since there is no overlap in frequency between profile 301 and profile 311, the second adjacent channel interference is totally avoided. Similarly, profiles 303 and 313 are complementary to each other. When profiles 303 and 313 are used in the two adjacent areas, they overlap each other by 5 kHz, as opposed to 10 kHz in the prior art case. As a result, the second adjacent channel interference occasioned thereby is accordingly reduced, with respect to the interference in the prior art case.

Figure 4A:
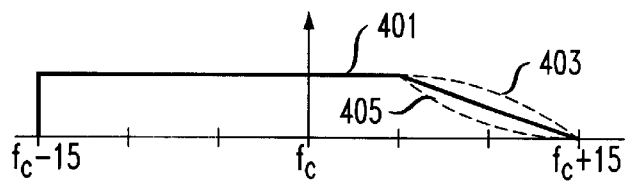
Figure 4B:
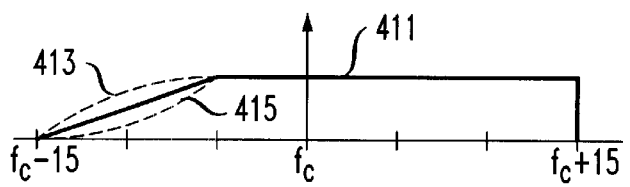

FIG. 4A illustrates other power profiles which may also be used in transmitter 203 to reduce the second adjacent channel interference. Specifically, power profile 401 defined by solid lines has a uniform non-zero power level from $f_c-15$ kHz to $f_c+5$ kHz, and a gradually reduced power level from $f_c+5$ kHz to $f_c+15$ kHz. For example, power profiles 403 and 405 are two different alternatives to profile 401, with their respective variations from profile 401 indicated by dash lines. Power profiles 401, 403 and 405 are used where the adjacent area is assigned a 20 kHz higher host AM carrier. On the other hand, power profiles 411, 413 and 415 in FIG. 4B, which are complementary to profile 401, 403 and 405, respectively, are used where the adjacent area is assigned a 20 kHz lower host AM carrier. For example, when profiles 401 and 411 are respectively implemented in two adjacent areas having their respective AM carriers 20 kHz apart, the two profiles overlap each other by 10 kHz. However, the respective power levels of profiles 401 and 411 in the conflicting 10 kHz subband are lower than those in the prior art case, thereby again reducing the second adjacent channel interference.

Figure 5A:
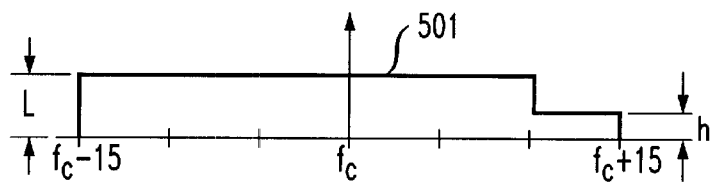
Figure 5B:
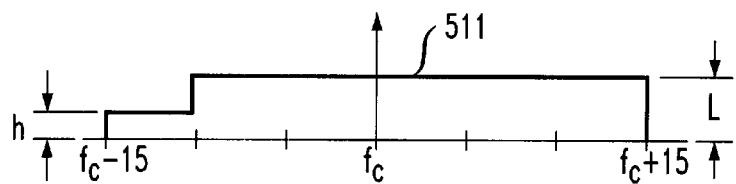

FIG. 5A illustrates power profile 501 which may also be used in transmitter 203 to reduce the second adjacent channel interference. As shown in FIG. 5A, profile 501 has a uniform non-zero power level, denoted L, from $f_c-15$ kHz to $f_c+10$ kHz, and a power level h from $f_c+10$ kHz to $f_c+15$ kHz, where h<L. FIG. 5B illustrates power profile 511 which is complementary to profile 501.

Figure 6A:
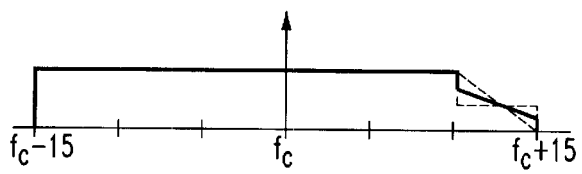
Figure 6B:
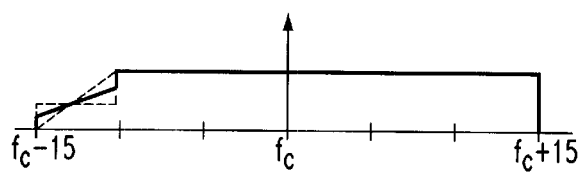

Similarly, FIG. 6A illustrates additional power profiles which may be used in transmitter 203 where the adjacent area is assigned a 20 kHz higher AM carrier, and FIG. 6B illustrates their respective complements.

Figure 7:
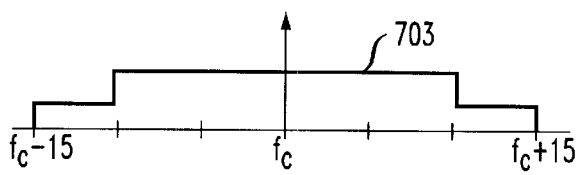
FIG. 7 illustrates a power profile which may be used in transmitter of FIG. 2 to transmit the digitally modulated signals in a first area when second and third areas adjacent thereto are respectively assigned an AM carrier having a higher frequency and an AM carrier having a lower frequency than that of the AM carrier assigned to the first area.

In the event that the area covered by transmitter 203 is adjacent to a first area assigned a 20 kHz higher AM carrier and a second are a assigned a 20 kHz lower AM carrier, it is apparent that, based on the disclosure heretofore, the power profile in accordance with the invention used in transmitter 203 in that case would have its power level partially or fully suppressed on both the high frequency end and low frequency end thereof to reduce or avoid the second adjacent channel interference coming bilaterally from the first and second areas. A simple way of designing such a power profile is forming a hybrid between a power profile in FIG. 3A, 4A, 5A or 6A and a power profile in FIG. 3B, 4B, 5B or 6B. For example, FIG. 7 illustrates power profile 703 in accordance with the invention which may be used in the bilateral interference case, and which is a hybrid between power profile 501 in FIG. 5A and power profile 511 in FIG. 5B. Profiles 501 and 511 are complementary in this instance and, as a result, profile 703 is symmetric about $f_c$. Other symmetric or asymmetric hybrid power profiles can similarly be derived for use in the bilateral interference case.

It should be pointed out at this juncture that use of a directional antenna to transmit digital information in a bilateral interference case would help render better communication performance than use of a hybrid power profile. Thus, where antenna 255 is directional and the adjacent channel interference comes from the first adjacent area assigned a 20 kHz higher AM carrier and the second adjacent area assigned a 20 kHz lower AM carrier, transmitter 203 would implement a power profile in FIG. 3A, 4A, 5A or 6A for digital transmission by antenna 255 toward the first area, and a different power profile in FIG. 3B, 4B, 5B or 6B for digital transmission by antenna 255 toward the second area.

Figure 8:
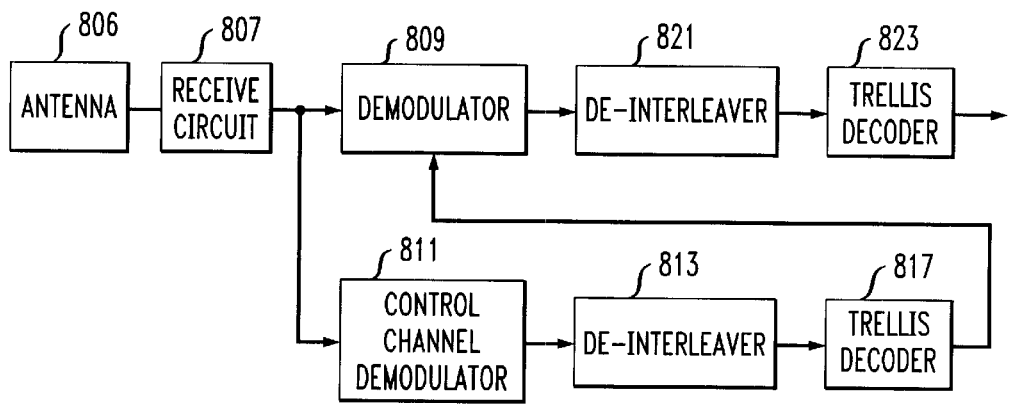
FIG. 8 is a block diagram of a receiver for receiving the digitally modulated signals transmitted by the transmitter of FIG. 2.

Referring to FIG. 8, receiver 803 receives the signal transmitted by transmitter 203 through antenna 806, which populates digital band 101 partially or fully. The received signal is processed by receive circuit 807 of conventional design, which performs an inverse function to transmit circuit 253 described above. The output of circuit 807 comprises the (M+1) pulse shaping carriers as transmitted, which are fed to both demodulator 809 and control channel demodulator 811. Demodulator 811 comprises a conventional AM tuner which is tuned beforehand to the frequency corresponding to that of the pulse shaping carrier containing the transmitted control data and control channel information. Accordingly, demodulator 811 generates a sequence of symbols representing such data and information. The generated symbols are de-interleaved by de-interleaver 813 which performs the inverse function to interleaver 229 described above. Based on the de-interleaved symbols and the signal constellation used in encoder 227 described before, trellis decoder 817 in a conventional manner determines what the most likely transmitted symbols are, in accordance with the well known Viterbi algorithm. The output of decoder 817 comprises the transmitted control data and control channel information and is fed to demodulator 809.

Demodulator 809 performs necessary reconfigurations based on the control channel information from demodulator 809, and generates a sequence of symbols representing the transmitted digital information based on the power profile identified by the control data from same. It should be pointed out that like modem 235, demodulator 809 includes a memory (not shown) in which the aforementioned $2^k$ sets of power profile parameters defining the corresponding power profiles are stored. The generated symbols are de-interleaved by de-interleaver 821 which performs the inverse function to interleaver 209 described above. Based on the de-interleaved symbols and the signal constellation used in encoder 207 described before, trellis decoder 823 in a conventional manner determines what the most likely transmitted symbols are, in accordance with the well known Viterbi algorithm, thereby recovering the transmitted digital information.

The foregoing merely illustrates the principles of the invention. It will thus be appreciated that those skilled in the art will be able to devise numerous other arrangements which embody the principles of the invention and are thus within its spirit and scope.

For example, in the disclosed embodiment, the illustrative power profiles in FIGS. 3A, 3B, 4A, 4B, 5A, 5B, 6A, 6B and 7 correspond to a digital band ranging from $f_c-15$ kHz to $f_c+15$ kHz. It will be appreciated that a person skilled in the art may expand or contract such a digital band depending on his/her particular applications and the particular frequencies of the interfering AM carriers. Accordingly, the range of the power profiles in accordance with the invention may expand or contract. Moreover, even if the interfering AM carriers consist of second adjacent carriers as in the disclosed embodiment, it will be appreciated that the illustrative power profiles in accordance with the invention may also be contracted, or expanded to extend beyond $f_c+15$ kHz in one frequency direction and/or $f_c-15$ kHz in the other frequency direction.

In addition, in the disclosed embodiment, the digital and control information to be transmitted is illustratively encoded with a trellis code. It will be appreciated that a person skilled in the art may utilize a different code than a trellis code, e.g., a Reed Solomon code, for encoding purposes, or even no code as in an uncoded multilevel modulation scheme. For that matter, different codes and/or modulation schemes may be utilized for the different carriers in multicarrier modem 235. It will also be appreciated that additional codes may be used to encode the information to increase its robustness during its transmission. For example, the information may be additionally encoded with a forward error correction code in transmitter 203 to allow a cyclic redundancy check thereon after it is received in receiver 803.

Moreover, in the disclosed embodiment, multicarrier modem 235 illustratively implements an OFDM scheme. It will be appreciated that a person skilled in the art may utilize in such a modem any other multicarrier scheme such as a frequency division multiplexed tone scheme, instead.

Finally, transmitter 203 and receiver 803 are disclosed herein in a form in which various transmitter and receiver functions are performed by discrete functional blocks. However, any one or more of these functions could equally well be embodied in an arrangement in which the functions of any one or more of those blocks or indeed, all of the functions thereof, are realized, for example, by one or more appropriately programmed processors.

We claim:

1. Apparatus for providing a plurality of digitally modulated signals containing information in a frequency and including an amplitude modulation (AM) carrier frequency, the apparatus comprising:

a generator for generating the digitally modulated signals based on at least one power profile, the at least one power profile defining relative power levels of the digitally modulated signals and being configured to reduce adjacent channel interference between the digitally modulated signals and an additional signal set associated with another carrier frequency, the digitally modulated signals populating the frequency band, power levels of a first subset of the digitally modulated signals populating a first subband in the frequency band being non-zero and relatively low, with respect to power levels of a second subset of the digitally modulated signals populating a second subband in the frequency band, the at least one power profile being identified by control information utilizable in a receiver to dynamically adapt the receiver to the at least one power profile in detecting at least a portion of the digitally modulated signals; and an interface for transmitting the digitally modulated signals.

2. The apparatus of claim 1 wherein the AM carrier frequency is used for radio broadcast.

3. The apparatus of claim 1 wherein the generator includes a modem implementing an orthogonal frequency division multiplexed (OFDM) scheme.

4. The apparatus of claim 1 wherein the information is encoded.

5. The apparatus of claim 4 wherein the information is encoded in accordance with a trellis coded scheme.

6. The apparatus of claim 1 wherein the first subband is located at an end of the frequency band.

7. The apparatus of claim 1 wherein the power profile is symmetric about the AM carrier frequency.

8. The apparatus of claim 1 wherein the at least one power profile includes a plurality of power profiles, the digitally modulated signals being generated based on a first one of the plurality of power profiles in a first direction, and based on at least a second one of the plurality of power profiles in at least a second direction.

9. Apparatus for providing a plurality of digitally modulated signals containing information in a frequency band including an AM carrier frequency, the apparatus comprising:

a generator for generating the digitally modulated signals based on at least one power profile, the at least one power profile defining relative power levels of the digitally modulated signals and being configured to reduce adjacent channel interference between the digitally modulated signals and an additional signal set associated with another carrier frequency, the digitally modulated signals populating the frequency band, the at least one power profile being asymmetric about the AM carrier frequency, the at least one power profile being identified by control information utilizable in a receiver to dynamically adapt the receiver to the at least one power profile in detecting at least a portion of the digitally modulated signals; and an interface for transmitting the digitally modulated signals.

10. Apparatus for communicating selected information and control information comprising:

a generator for generating a plurality of signals representing the selected information and the control information; and a controller responsive to the control information for selecting at least one power profile, the at least one power profile defining relative power levels of the signals and being configured to reduce adjacent channel interference between the plurality of signals and an additional signal set associated with an adjacent channel carrier frequency, the plurality of signals being generated based on the selected power profile, the at least one power profile being identified by the control information, the control information being utilizable in a receiver to dynamically adapt the receiver to the at least one power profile in detecting at least a portion of the plurality of signals.

11. The apparatus of claim 10 wherein the generator includes a modem implementing an OFDM scheme.

12. The apparatus of claim 10 wherein at least one of the signals represents the control information, the at least one signal occupying a frequency band which includes an AM carrier frequency.

13. The apparatus of claim 12 wherein the AM carrier frequency is used for radio broadcast.

14. The apparatus of claim 10 wherein the selected information and the control information are encoded.

15. The apparatus of claim 14 wherein the selected information and the control information are encoded in accordance with a first trellis coded scheme and a second trellis coded scheme, respectively.

16. The apparatus of claim 10 wherein the generator includes the controller.

17. Apparatus for receiving a plurality of signals comprising:
an interface for receiving the signals, at least one of the signals containing control information concerning at least one power profile, the at least one power profile defining relative power levels of the signals and being configured to reduce adjacent channel interference between the plurality of signals and an additional signal set associated with an adjacent channel carrier frequency; and
a receiver for recovering the control information in response to the at least one of the plurality of signals, the at least one power profile being identified by the control information, the control information being utilizable in the receiver to dynamically adapt the receiver to the at least one power profile in detecting at least a portion of the plurality of signals.

18. The apparatus of claim 17 wherein the at least one of the signal occupies a frequency band which includes an AM carrier frequency.

19. The apparatus of claim 18 wherein the AM carrier frequency is used for radio broadcast.

20. The apparatus of claim 18 wherein the demodulator includes circuitry for tuning to the AM carrier frequency.

21. The apparatus of claim 17 wherein the receiver includes the interface.

22. The apparatus of claim 17 wherein the control information is encoded.

23. The apparatus of claim 22 wherein the control information is encoded in accordance with a trellis coded scheme.

24. A method for providing a plurality of digitally modulated signals containing information in a frequency band including an AM carrier frequency, the method comprising:
generating the digitally modulated signals based on at least one power profile, the at least one power profile defining relative power levels of the digitally modulated signals and being configured to reduce adjacent channel interference between the digitally modulated signals and an additional signal set associated with another carrier frequency; and
arranging the digitally modulated signals to populate the frequency band, power levels of a first subset of the digitally modulated signals populating a first subband in the frequency band being non-zero and relatively low, with respect to power levels of a second subset of the digitally modulated signals populating a second subband in the frequency band, the at least one power profile being identified by control information utilizable in a receiver to dynamically adapt the receiver to the at least one power profile in detecting at least a portion of the digitally modulated signals.

25. The method of claim 24 wherein the AM carrier frequency is used for radio broadcast.

26. The method of claim 24 wherein the information is encoded.

27. The method of claim 26 wherein the information is encoded in accordance with a trellis coded scheme.

28. The method of claim 24 wherein the first subband is located at an end of the frequency band.

29. The method of claim 24 wherein the power profile is symmetric about the AM carrier frequency.

30. The method of claim 24 wherein the at least one power profile includes a plurality of power profiles, the digitally modulated signals being generated based on a first one of the plurality of power profiles in a first direction, and based on at least a second one of the plurality of power profiles in at least a second direction.

31. A method for providing a plurality of digitally modulated signals containing information in a frequency band including an AM carrier frequency, the method comprising:
generating the digitally modulated signals based on at least one power profile, the at least one power profile defining relative power levels of the digitally modulated signals and being configured to reduce adjacent channel interference between the digitally modulated signals and an additional signal set associated with another carrier frequency; and
arranging the digitally modulated signals to populate the frequency band, the at least one power profile being asymmetric about the AM carrier frequency, the at least one power profile being identified by control information utilizable in a receiver to dynamically adapt the receiver to the at least one power profile in detecting it least a portion of the digitally modulated signals.

32. A method for communicating selected information and control information comprising:
generating a plurality of signals representing the selected information and the control information; and
in response to the control information, selecting at least one power profile, the at least one power profile defining relative power levels of the signals and being configured to reduce adjacent channel interference between the plurality of signals and an additional signal set associated with an adjacent channel carrier frequency, the plurality of signals being generated based on the selected power profile, the at least one pow profile being identified by the control information, the control information being utilizable in a receiver to dynamically adapt the receiver to the at least one power profile in detecting at least a portion of the plurality of signals.

33. The method of claim 32 wherein the signals are generated also based on an OFDM scheme.

34. The method of claim 32 wherein at least one of the signals represents the control information, the at least one signal occupying a frequency band which includes an AM carrier frequency.

35. The method of claim 34 wherein the AM carrier frequency is used for radio broadcast.

36. The method of claim 32 wherein the selected information and the control information are encoded.

37. The method of claim 36 wherein the selected information and the control information are encoded in accordance with a first trellis coded scheme and a second trellis coded scheme, respectively.

38. A method for receiving a plurality of signals comprising:
receiving the signals, at least one of the signals containing control information concerning at least one power profile, the at least one power profile defining relative power levels of the signals and being configured to reduce adjacent channel interference between the plurality of signals and an additional signal set associated with an adjacent channel carrier frequency; and recovering the control information in response to the at least one of the plurality of signals, the at least one power profile being identified by the control information, the control information being utilizable to dynamically adapt a receiver to the at least one power profile in detecting at least a portion of the plurality of signals.

39. The method of claim 38 wherein the at least one of the signals occupies a frequency band which includes an AM carrier frequency.

40. The method of claim 39 wherein the AM carrier frequency is used for radio broadcast.

41. The method of claim 39 wherein the recovering step includes the step of tuning to the AM carrier frequency.

42. The method of claim 38 wherein the control information is encoded.

43. The method of claim 42 wherein the control information is encoded in accordance with a trellis coded scheme.

* * * * *